United States Patent
Faillaci, III et al.

(10) Patent No.: US 9,292,413 B2
(45) Date of Patent: Mar. 22, 2016

(54) SETTING BREAKPOINTS IN A CODE DEBUGGER USED WITH A GUI OBJECT

(71) Applicant: International Business Machines Corporation, Armonk, NY (US)

(72) Inventors: Anthony E. Faillaci, III, Austin, TX (US); Matthew C. Hillary, Tyler, TX (US); Jorge R. Nogueras, Austin, TX (US); Irina Tyshkevich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/965,612

(22) Filed: Aug. 13, 2013

(65) Prior Publication Data

US 2015/0052502 A1 Feb. 19, 2015

(51) Int. Cl.
 *G06F 11/36* (2006.01)
 *G06F 3/0482* (2013.01)
(52) U.S. Cl.
 CPC .......... *G06F 11/3636* (2013.01); *G06F 3/0482* (2013.01)
(58) Field of Classification Search
 None
 See application file for complete search history.

(56) References Cited

U.S. PATENT DOCUMENTS

| | | | |
|---|---|---|---|
| 5,781,720 A | 7/1998 | Parker et al. | |
| 6,114,978 A * | 9/2000 | Hoag | 341/23 |
| 7,287,230 B2 | 10/2007 | Austin et al. | |
| 8,140,986 B2 * | 3/2012 | Zhao | 715/762 |
| 8,726,209 B1 * | 5/2014 | Lamant et al. | 716/111 |
| 2003/0018953 A1 * | 1/2003 | Aberg | 717/105 |
| 2003/0106046 A1 * | 6/2003 | Arnold et al. | 717/129 |
| 2005/0210335 A1 * | 9/2005 | Muratori et al. | 714/35 |
| 2006/0005207 A1 * | 1/2006 | Louch et al. | 719/328 |
| 2007/0168736 A1 * | 7/2007 | Ottavi et al. | 714/34 |
| 2007/0240123 A1 * | 10/2007 | Bustelo et al. | 717/129 |
| 2007/0240125 A1 * | 10/2007 | Degenhardt et al. | 717/129 |
| 2007/0250819 A1 * | 10/2007 | Fjeldstad et al. | 717/129 |
| 2008/0201687 A1 * | 8/2008 | Soroker et al. | 717/101 |
| 2009/0150870 A1 * | 6/2009 | Bates | 717/129 |
| 2010/0077325 A1 | 3/2010 | Barnea et al. | |
| 2012/0102469 A1 * | 4/2012 | Kapoor et al. | 717/129 |
| 2013/0091494 A1 * | 4/2013 | Sowerby et al. | 717/129 |

OTHER PUBLICATIONS

"CodeWarrior Development Tools", Freescale Semiconductor, Inc., copyright 2004-2013, 1 page. Accessed Jun. 21, 2013, www.freescale.com/webapp/sps/site/homepage.jsp?code=CW_HOME.
"Eclipse Downloads" The Eclipse Foundation, copyright 2013, 4 pages. Accessed Jun. 21, 2013, www.eclipse.org/downloads.

(Continued)

*Primary Examiner* — William Bashore
*Assistant Examiner* — Daniel Parcher
(74) *Attorney, Agent, or Firm* — Yee & Associates, P.C.; Parashos Kalaitzis

(57) ABSTRACT

An embodiment of the invention pertains to debugging program code associated with graphical objects, wherein the code responds to events of user interactions with the object. A menu is generated that includes user interaction events, and an associated program window is adapted to present the menu to a user when requested, wherein the user can select user interaction events from the menu. For each selected event, the method identifies a component of the program code that is responsive to that selected event. The method further includes setting a breakpoint in the program code in selected relationship with each identified program code component, wherein the subsequent occurrence of one of the selected user interaction events triggers a corresponding one of the breakpoints.

20 Claims, 5 Drawing Sheets

(56) References Cited

OTHER PUBLICATIONS

"IntelliJ IDEA—The Best Java and Polyglot IDE", JetBrains, copyright 2000-2013, 6 pages. Accessed Jun. 20, 2013, www.jetbrains.com/idea/.

"Walkthrough: Explore the Visual Studio IDE with C# or Visual Basic", Microsoft, copyright 2013, 24 pages. Accessed Jun. 21, 2013, msdn.microsoft.com/en-us/library/vstudio/jj153219.aspx.

* cited by examiner

FIG. 2

```
//----------------------------------------
// file name: userActions.java
//
202  // Description: Sample of a partial listing
     // of source code for a program window
     // comprising three widgets.
     //----------------------------------------

204  public void actionPerformed (ActionEvent event) ..........................line 005
     {

206     Graphical Object source = event.getSource(); // Get the reference to the Graphical
        Object that the event came from.

// Widget-1 user actions
        if (source == ButtonofW1) (line 009)
208     {
            source.processButton();.................................................line 010
        }

// Widget-2 user actions
        else if (source == yesButtonofW2) (line 012)
        {
            source.processYes();(line 013)
        }
        else if (source == noButtonofW2) (line 014)
210     {
            source.processNo();.....................................................line 015
        }
        else if (source == askLaterButtonofW2) (line 016)
        {
            source.processAskLater();(line 017)
        }

// Widget-3 user actions
        else if (source == textFieldofW3) (line 019)
212     {
            if (name.getText().length()>0) message.setText("Hello, " + name.getText());.........line 020
            else message.setText("Please enter your name.");(line 021)
        }
     }

214  public void processFocusEvent(FocusEvent event)
     {
        if (event.getID() == event.FOCUS_GAINED) // on focus for program window
        (all widgets) (line 24)
216     {
            message.setText("Please enter your name.");  .....................line 025
        }
218     super.processFocusEvent(event);
     }
```

FIG. 5
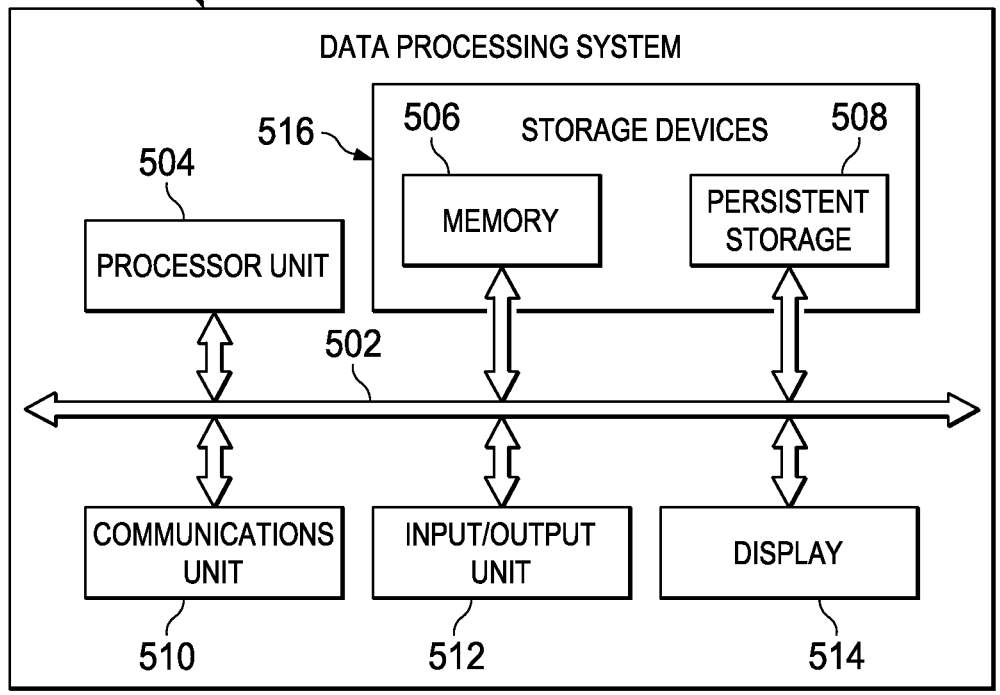
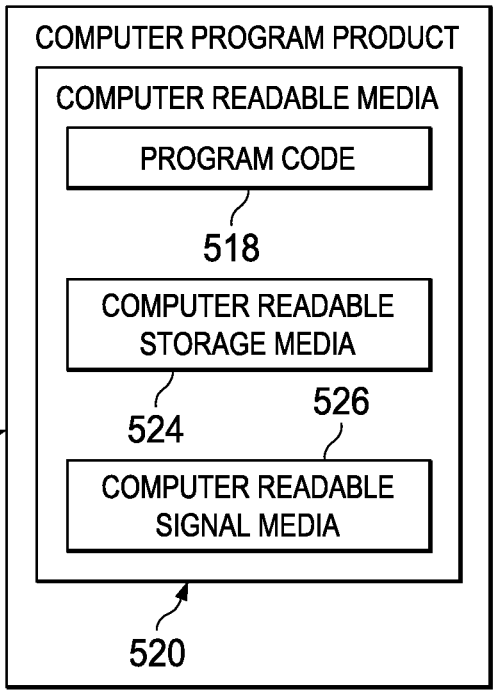

SETTING BREAKPOINTS IN A CODE DEBUGGER USED WITH A GUI OBJECT

BACKGROUND

1. Field:

The invention disclosed and claimed herein generally pertains to use of a computer program code debugger, or debugging tool, by a program developer or other user in an environment that may include an Integrated Development Environment (IDE). More particularly, the invention pertains to setting breakpoints for debugging program code that can display or present a graphical user interface (GUI) widget, or other graphical objects, to the program developer or other user.

2. Description of the Related Art

As is known by those of skill in the art, a code debugger is a tool used by software developers that allows them to get further insight into a program they are writing, such as to determine why the program is crashing at a particular instruction, or what the values of the variables of a program are at a particular point in time. Debuggers execute the program being developed under a special runtime environment that allows the debugging tool to manipulate the code flow in a way that may aid the developer. For instance, the user may request the debugger to execute the program being developed up to a certain instruction, and to then stop and allow the developer to see the values of certain variables, or to even modify the values of some variables, before allowing the program to continue. The developer may also desire to execute the program line by line, so he or she can closely monitor program behavior.

A very important capability of debuggers is that of setting a "breakpoint." A breakpoint is a marker in the program code that tells the debugger to pause execution at a particular place or location of the program, at which the developer may inspect variables, initiate step-by-step execution, or take other actions. Breakpoints, by way of example, can be set at the beginning of a particular method, at a specific line of a particular source file, or when a particular exception is thrown. In many of these cases, the developer needs to first identify the source file where the breakpoint must be set, and then instruct the debugger to set a breakpoint at the desired place. Since most debuggers are integrated within a graphical IDE, this is usually done by clicking on a particular line of code and then selecting an option to set a breakpoint there. Examples of commercial and non-commercial IDEs that allow setting breakpoints in code during debugging are known by those of skill in the art.

When debugging a program that presents a GUI object to a user, for example, a program being developed that shows a screen to a user which displays one or more graphical widgets, the developer may want to set a breakpoint in connection with certain user interactions with the displayed widgets. By way of example, such interactions could include clicking on a button, selecting a particular option in a drop-down list, or writing some text in a text box. In the current state of the art, this implies that the developer must figure out what source file contains the code that implements the behavior of the particular button, drop-down list or text box, so that he or she may then set a breakpoint in the appropriate line of code by using the integrated debugger. However, depending on the developer's expertise and familiarity with the graphical aspects of the program being developed, this may not be a trivial endeavor. Another situation that may arise is that the developer does not have access to the source code that calls up the GUI widget, so setting a breakpoint using the source code may not even be possible

SUMMARY

Embodiments of the invention provide a method, apparatus and computer program product for use with a debugging tool. Respective embodiments enable a developer of source code to operate a GUI widget or other object to set breakpoints graphically, that is, by interacting with the graphical output component of the program. In these embodiments breakpoints would be triggered in response to predetermined user interactions with a graphical widget or other object. The user interaction events could occur, by way of example, when a button is focused on or clicked; when either particular text or any text is written into a text box; when a drop-down list is selected; or when a particular item within the list is chosen. However, the invention is by no means limited thereto.

An embodiment of the invention is directed to a computer implemented method associated with a tool for debugging computer program code. The program code is capable of presenting a graphical object, and is responsive to each of one or more events of user interaction with the graphical object. The method includes the step of generating a list or menu that includes one or more of the user interaction events. The method further includes adapting a window associated with the graphical object to present the menu to a user in response to a specified user request action, wherein the user is enabled to select one or more of the user interaction events included in the presented menu. For each selected user interaction event, the method identifies a component of the program code that is associated with that selected user interaction event. The method further includes setting a breakpoint in the program code in selected relationship with each identified program code component, wherein the subsequent occurrence of one of the selected user interaction events triggers a corresponding one of the breakpoints.

BRIEF DESCRIPTION OF THE SEVERAL VIEWS OF THE DRAWINGS

FIG. 2 shows an exemplary portion of program code for the embodiment of FIG. 1, which pertains to graphical objects thereof.

FIG. 5 is a block diagram showing a computer or data processing system that may be used in implementing embodiments of the invention.

DETAILED DESCRIPTION

Figure 1:
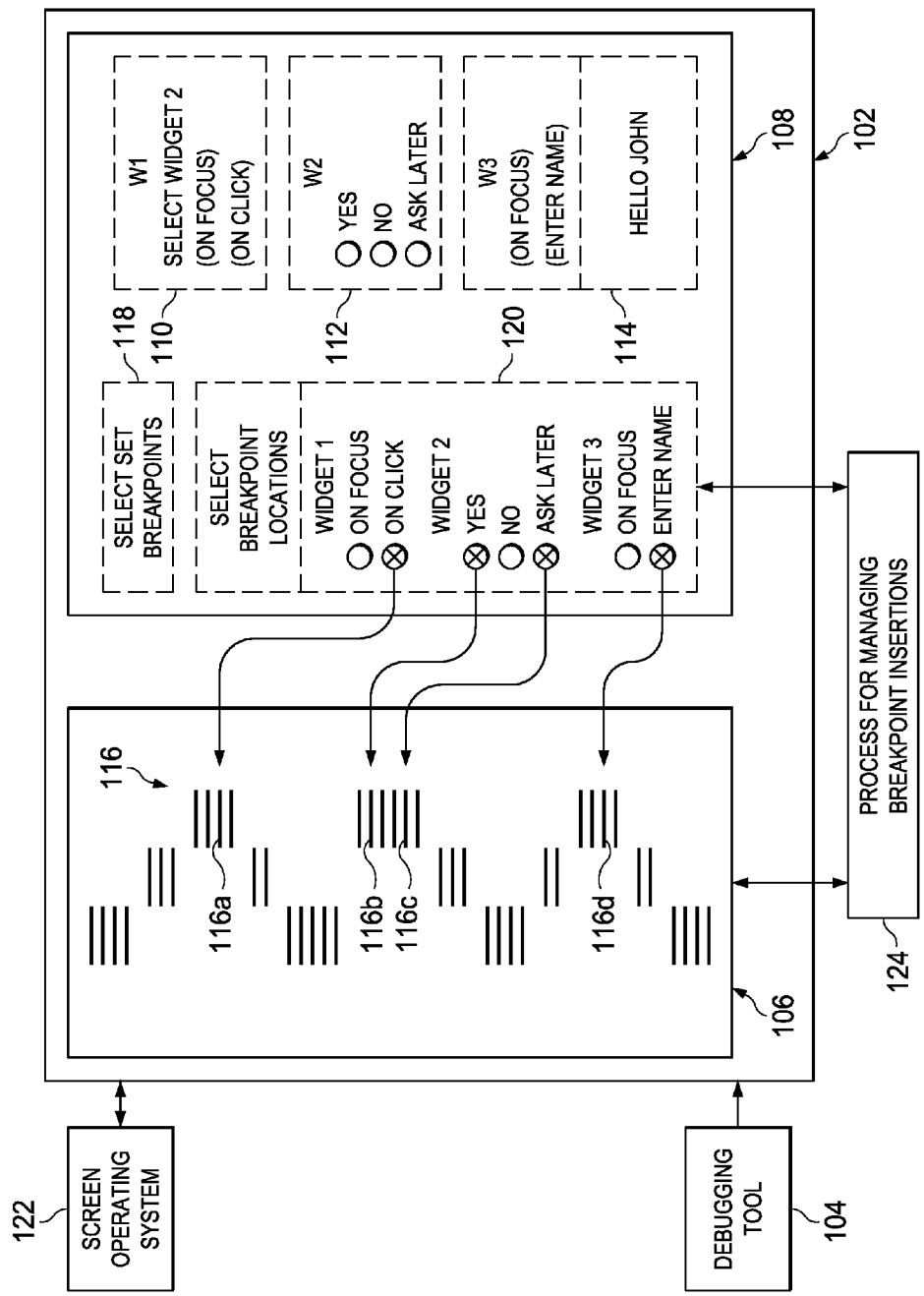
FIG. 1 is a schematic diagram showing a screen displaying windows that illustrates implementation of an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a screen displaying certain windows, in order to illustrate implementation of an embodiment of the invention. FIG. 1 more specifically shows a display screen 102 associated with a code debugger or debugging tool 104, of the type described above. Thus, display screen 102 can be used by a software developer or other user to debug program code that is being developed. More particularly, the display screen 102 and other components of FIG. 1 are intended for use in debugging a program that presents one or more graphical objects to a program user, wherein the user is able to interact with the graphical objects to produce respectively corresponding results or responses.

FIG. 1 further depicts screen 102 displaying a debugging window 106 and a program window 108, wherein the program window 108 shows several examples of graphical objects of the above type. These comprise exemplary GUI widgets 110-114, also referenced as W1-W3, respectively. As is known by those of skill in the art, a GUI widget is an element of a graphical user interface that displays an information arrangement which is changeable by a user, such as a window or a text box. A widget typically provides a single interaction point for direct manipulation of a given kind of data. Thus, a widget is a basic visual building block which is available for user interaction events, or user inputs, in regard to data associated with the widget. However, it is to be emphasized that the term "graphical objects", as used herein, need not be limited to GUI widgets.

Widget W1 comprises a button, and is thus responsive to a user moving a mouse pointer over the widget W1 (on focus), in order to select or highlight W1. Widget W1 also responds to a mouse click (on click) when the pointer is on focus, in order to execute a function or to achieve a result. The result of clicking on the button comprising widget W1 is selection of widget W2.

Widget W2 is a drop-down list that presents the user with several choices, which the user may select in regard to a particular matter. The choices are "Yes", "No" and "Ask Later". For each choice selected by a user, a corresponding response or result associated with the particular matter is provided by widget W2.

Widget W3 is a text box that produces a response when text such as the exemplary name "JOHN" is inserted therein. Widget W3 may be configured to provide different responses to different text entries.

Referring further to FIG. 1, debugger window 106 schematically represents a snippet or portion 116 of the source code of the program which is being debugged by tool 104. More particularly, the code portion 116 comprises the code components that respectively interact with and respond to the widgets W1-W3. Thus, the code component for a given widget, in response to a user interaction event occurring at the given widget, produces a result or response which corresponds to that user interaction event. As an example of this, the user interaction event of clicking on widget W1 causes the code component for widget W1, which is included in snippet 116, to provide the result of selecting widget W2. An exemplary code snippet or portion 116 is described hereinafter in further detail, in connection with FIG. 2.

In accordance with embodiments of the invention, it has been recognized that it may be very beneficial to set breakpoints in program code, for purposes of debugging at locations in code components that are associated with user interaction events, such as described above. It could be particularly useful to set breakpoints at or adjacent to the lines of code which produce responses to, or which immediately follow, respective user interaction events. A code developer could thereby stop execution of a program being debugged simply by carrying out an appropriate user interaction event. Moreover, it would be useful to enable a debugging tool user to select particular user interaction events, associated with widgets and other graphical objects, that will trigger breakpoints at corresponding selected locations of the program code.

In furtherance of these objectives, program window 108 is configured to display a button 118, labeled "SELECT SET BREAKPOINTS". If a user applies a right click to this button, a list or menu of options 120 will be displayed on window 108. This menu, labeled "SELECT BREAKPOINT LOCATIONS", shows all of the user interaction events that can be carried out by a user, in regard to all graphical widgets or other objects that the program code can present to the user. The user may then select one or more of the events included on the menu 120.

In a useful embodiment, program window 108 is operated to present or display select button 118 and the menu 120 by selectively modifying the source code which is being debugged and which includes the code snippet 116. Additionally or alternatively, the display of button 118 and menu 120 could be implemented by selectively adapting the operating system for the display screen, such as by using certain application program interfaces (APIs).

For the example of FIG. 1, the menu displays all of the possible user interaction events for the widgets W1-W3. Thus, menu 108 displays "on focus" and "on click" events for widget W1; selection events of "Yes", "No" and "Ask Later" for widget W2; and "on focus" and "Enter Name" events for widget W3.

Referring further to FIG. 1, menu 120 shows that a user has selected the user interaction event "on click" of widget W1; the selection events "Yes" and "Ask Later" of widget W2; and the "Enter Name" event of widget W3. In response to each of these selected user interaction events, the line of code that immediately follows the selected event in the code snippet 116 is identified, as described hereinafter in connection with FIG. 3. A breakpoint is then set at each of the identified code lines. FIG. 1 shows a breakpoint set at line 116a for the widget W1 event selection; breakpoints set at lines 116b and 116c for the widget W2 selections; and a breakpoint set at line 116d for the widget W3 selection. Accordingly, when a program is being executed under a debugging runtime environment, a breakpoint will be triggered to stop execution, immediately after a user performs one of the selected user interaction events.

FIG. 1 further shows an operating system 122 for the display screen 102, and also a process component 124, for managing breakpoint insertions in code snippet 116. Generally, process component 124 identifies respective user interaction events that need to be included as options on the menu 120, and then constructs the menu for presentation to a user in response to a user request action. The process component 124 further manages the setting of breakpoints, by determining the line number of each line of code at which a breakpoint is to be set, for each user interaction event option on the menu. Process component 124 then sets breakpoints in the code component 116, in corresponding relationship with the selected user interaction events and the determined line numbers.

Usefully, process component 124 comprises a specified software component, or alternatively comprises a software component and a processor. Operation of process component 124 is described hereinafter in further detail, in connection with the method of FIG. 3.

Referring to FIG. 2, an exemplary portion of program code is shown, which may be used as the code snippet 116 of FIG. 1. Statements at bracket 202 of FIG. 2 comprise comment text, which indicates that the code of FIG. 2 is a sample of a partial listing of source code for a program window comprising three widgets. Each line of code of FIG. 2 may be identified by a line number, with every fifth number actually being shown. Certain other line numbers are also shown in parentheses, and are referred to hereinafter.

The code at bracket 204 implements a function to process user interaction events, such as those of widgets W1-W3. At bracket 206, the reference for a Graphical Object source comprising widgets, or its location in memory, is acquired.

At bracket 208, user action in regard to widget W1 is considered. If there is an action of the user comprising an "on click" of the W1 button, that action is checked or determined at the line 009. If the check is affirmative, the action is responded to by processing at line 010, to provide the result of an "on click".

At bracket 210, user actions in regard to widget W2 are considered. If there is an action of the user to select "Yes", and that action is checked and determined to be affirmative at line 012, that action is responded to by processing at line 013. Similarly, an action to select "No" is checked at line 014, and if positive is responded to at line 015. An action to select "Ask Later" is checked at line 016 and is responded to at line 017.

At bracket 212, user action in regard to widget W3 is considered. If the user has entered a name or other text in the text box of widget W3, the code checks this at line 019. If the event check is affirmed, it is followed immediately at line 020 by combining the name with the greeting Hello.

The code of bracket 214 implements a function to process user focus events, such as those of widgets W1 and W3. At bracket 216, the code of lines 024 and 025 checks to determine whether there was a user "on focus" event in regard to any of the widgets. Line 025 is an extraneous line of code required for an embodiment of the invention, as described hereinafter in connection with FIG. 3. The code at bracket 218 directs to a default process for processing focus events.

Figure 3:
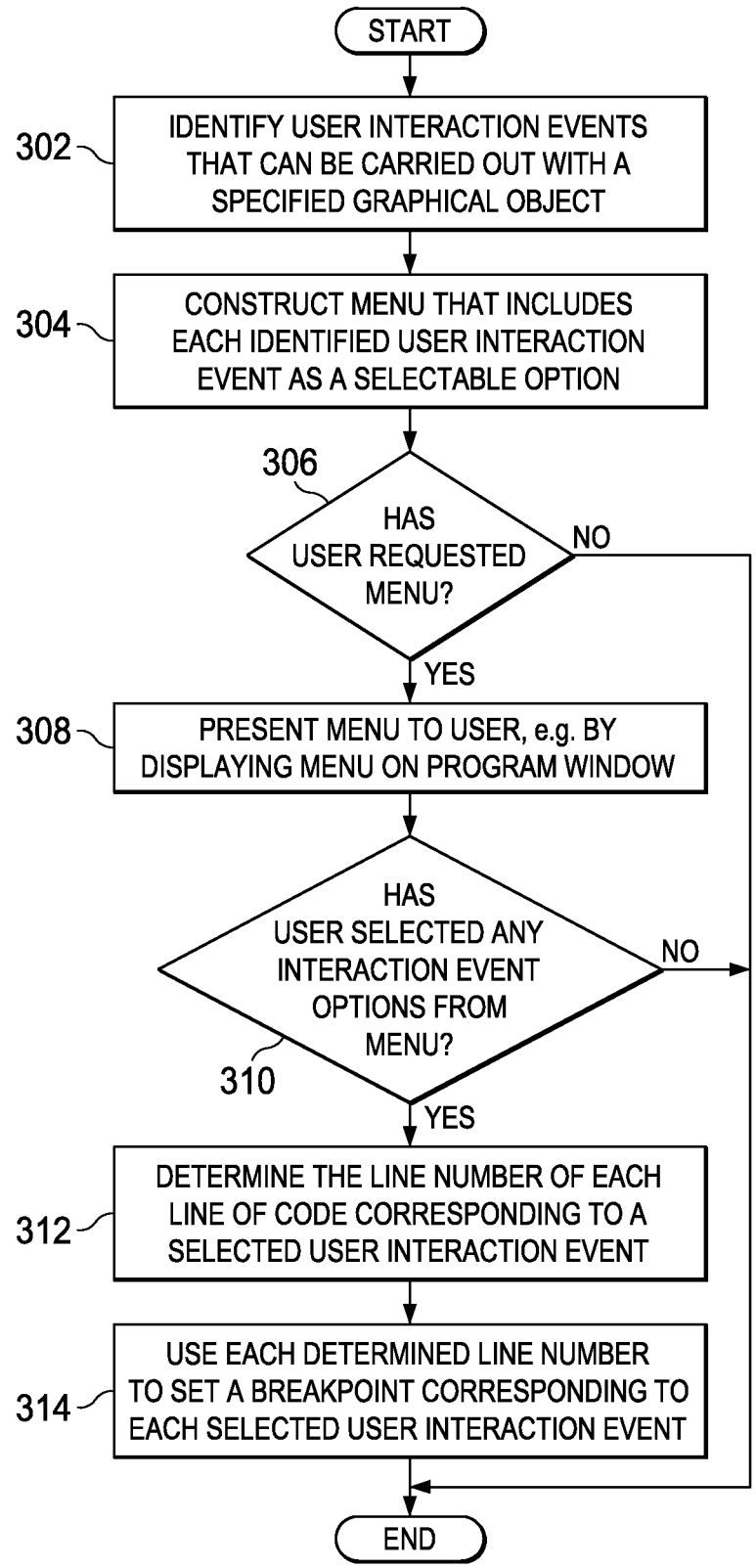
FIG. 3 is a flowchart showing steps of a method for setting or inserting breakpoints in program code of the embodiment of FIG. 1.

Referring to FIG. 3, there are shown steps of a method comprising an embodiment of the invention. At step 302, user interaction events that can be carried out with a graphical object, such as the events described above in connection with widgets W1-W3, are identified. Usefully, this task is performed by process component 124. More particularly, component 124 is operated to parse code such as the code portion shown in FIG. 2. In this operation, process component 124 checks or tests for user interaction events included in the code, such as the user actions at lines 009, 012, 014 016, and 019. Moreover, process component 124 must match each user action event it discovers with a graphical object associated with the code, such as one of the widgets W1-W3.

After identifying user interaction events at step 302, step 304 is implemented, to construct or generate a menu that includes all of the identified user interaction events. Step 304 may also be carried out by process component 124, which constructs menu 120 as described above in connection with FIG. 1. As further described, menu 120 provides each interaction event thereof as a user selectable option.

Decision step 306 determines whether or not a user has requested presentation of the menu. In the embodiment of FIG. 1, a user can request the menu 120 by the action of clicking on the "SELECT SET BREAKPOINTS" button 118. As an alternative, the system could be arranged so that the user would request the menu 120 by focusing on the menu, and then right clicking on it.

If the query at decision step 306 is negative, the method of FIG. 3 ends. Otherwise, the method proceeds to step 308, which presents the menu with its options to a user. Usefully, the menu is presented by displaying it on an associated program window. This is exemplified by the embodiment of FIG. 1, wherein both the selection button 118 and the menu 120 can be displayed on program window 108.

Decision step 310 determines whether or not the user has selected any interaction event options from the menu. If not, the method of FIG. 3 ends, and otherwise proceeds to step 312. At step 312 the line number of each line of code is determined, for each line of code that corresponds to a user interaction event selected from the menu. Step 314 then uses each determined line number, to set a breakpoint that also corresponds to one of the selected user interaction events. Usefully, the breakpoint for a given user interaction event will be set at the line of code that immediately follows the line of code which was determined at step 312 as corresponding to the given user interaction event.

Process component 124, for managing breakpoint insertions, can readily be used to implement the steps 310-314 of the method of FIG. 3. Using the illustrations of FIGS. 1 and 2, process component 124 recognizes, in accordance with step 310, that a user has selected certain event options of menu 120, as described above. In accordance with step 312, process component 124 determines that code line 009 corresponds to the "on click" event of widget W1. Moreover, component 124 determines that code lines 012 and 016 respectively correspond to the "Yes" and "Ask Later" selections of widget W2, and line 019 corresponds to the "Enter Name" event of widget W3.

In order to carry out final step 314, process component 124 sets a breakpoint at the line of code which immediately follows each line of code determined at step 312. Accordingly, breakpoints are set at lines 010; 013; 017; and 020. By doing this, a subsequent execution of the program in debugging mode will be halted, in response to an occurrence of each of the selected user interaction events.

It is to be emphasized that the invention can have other embodiments, in addition to the embodiment described above. In another embodiment of the invention, the separate select button 118 and menu 120 would not be used. Instead, each GUI object, such as each of the widgets W1-W3, would be provided with a configurable key combination for use in setting breakpoints, for example, pressing the control key of the keyboard in combination with a right mouse click. Then, when the GUI object was being run under the auspices of the debugging tool, the key combination would be used in setting breakpoints for that object. More particularly, if the object was widget W1, and the key combination was the control key and right click combination by way of example, that key combination would be applied or inputted to the displayed widget W1 when running in debug mode.

In response to inputting the key combination, a context menu would appear on widget W1. The context menu would offer choices to the user, comprising each of the user interaction events that could be implemented with that object. These choices would be presented to the user as selectable options, in the manner of menu 120 as described above. For the example of widget W1, its context menu would show on focus and on click options. The user would then select one or more of the user interaction event options of the context menu.

After selection of events for the GUI object, the debugging tool would identify the program code component associated with each selected event, and would set breakpoints in relation thereto, in the manner described above.

It is to be noted that line 025 was included in the code of FIG. 3, in order to have a line available for setting a breakpoint, in the event of a user "on focus" action.

Figure 4:
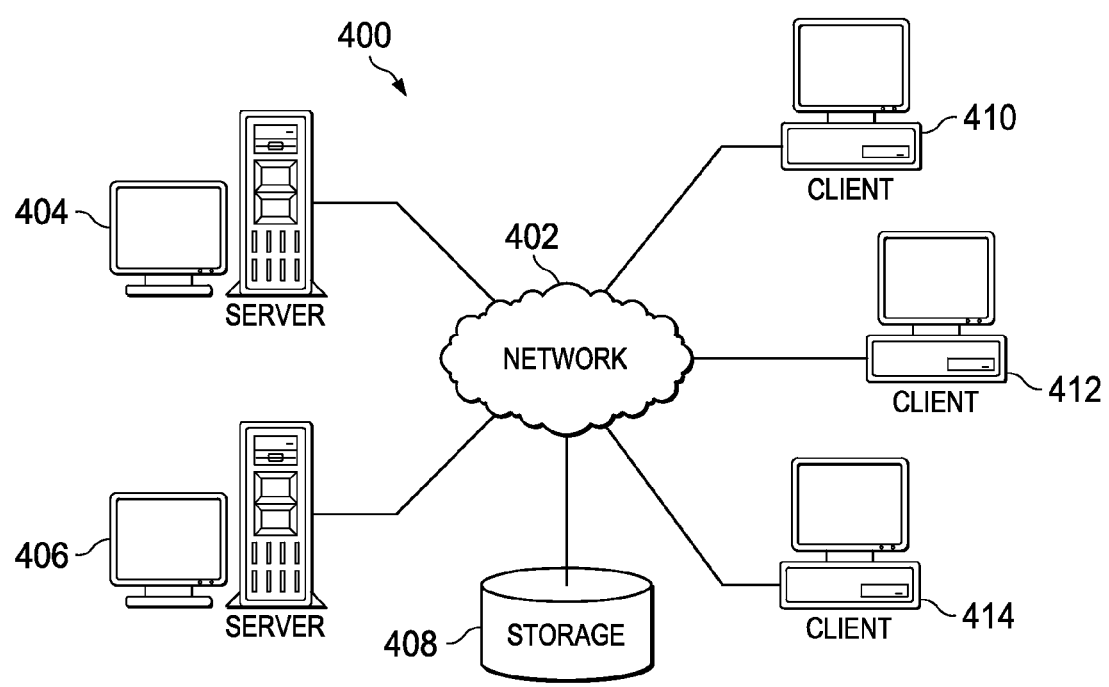
FIG. 4 is a block diagram showing a network of data processing systems in which an embodiment of the invention may be implemented.

FIG. 4 is a pictorial representation of a network of data processing systems in which illustrative embodiments of the invention may be implemented. Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server computer 404 and server computer 406 connect to network 402 along with storage unit 408. In addition, client computers 410, 412, and 414 connect to network 402. Client computers 410, 412, and 414 may be, for example, personal computers or network computers. In the depicted example, server computer 404 provides information, such as boot files, operating system images, and applications to client computers 410, 412, and 414. Client computers 410, 412, and 414 are clients to server computer 404 in this example. Network data processing system 400 may include additional server computers, client computers, and other devices not shown.

Program code located in network data processing system 400 may be stored on a computer-recordable storage medium and downloaded to a data processing system or other device for use. For example, program code may be stored on a computer-recordable storage medium on server computer 404 and downloaded to client computer 410 over network 402 for use on client computer 410.

In the depicted example, network data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 400 also may be implemented as a number of different types of networks, such as, for example, an intranet, a local area network (LAN), or a wide area network (WAN). FIG. 4 is intended as an example, and not as an architectural limitation for the different illustrative embodiments.

Turning now to FIG. 5, an illustration of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to process instructions for software that may be loaded into memory 506. Processor unit 504 may be a number of processors, a multi-processor core, or some other type of processor, depending on the particular implementation. "A number," as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for processing by processor unit 504. The processes of the different embodiments may be performed by processor unit 504 using computer-implemented instructions, which may be located in a memory, such as memory 506.

These instructions are referred to as program code, computer usable program code, or computer readable program code that may be read and processed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for processing by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500.

In some instances, computer readable storage media 524 may not be removable from data processing system 500. In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, a remote data processing system, or some other device capable of storing and transmitting program code 518. For example, program code stored in the computer readable storage medium in data processing system 500 may be downloaded over a network from the remote data processing system to the computer readable storage medium in data processing system 500. Additionally, program code stored in the computer readable storage medium in the server computer may be downloaded over the network from the server computer to a computer readable storage medium in the remote data processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. In association with a tool for debugging computer program code, the computer program code capable of presenting a graphical object, wherein the computer program code is responsive to each of one or more events of user interaction with the graphical object, a computer implemented method comprising:

generating a menu that includes one or more of the user interaction events;

adapting a window associated with the graphical object to present the menu to a user, wherein the user is enabled to select one or more of the user interaction events included in the presented menu;

for a given user interaction event selected by the user, identifying a component of the computer program code that is associated with that selected user interaction event; and setting a breakpoint in the computer program code in selected relationship with each identified computer program code component, wherein a subsequent occurrence of one of selected user interaction events triggers a corresponding breakpoint, and wherein:

the computer program code is computer program code of the graphical object and includes a computer program code component for the user interaction event associated with the graphical object;

the tool for debugging has a program window, which displays the graphical object, and is adapted to present the menu to the user, and wherein the computer program code is the computer program code of the graphical object and includes the computer program code component for the user interaction event associated with the graphical object;

the tool for debugging displays a debugging window and the program window;

the debugging window displays the computer program code of the graphical object including the computer program code component for the user interaction event associated with the graphical object;

the program window displays the graphical object, the menu, and a display button;

responsive to a right click on the display button, the menu is displayed including the user interaction event associated with the graphical object; and responsive to selection of the user interaction event from the menu, the breakpoint is set in the computer program code component for the user interaction event associated with the graphical object, and the breakpoint is displayed in the computer program code component displayed in the debugging window.

2. The computer implemented method of claim 1, wherein: the tool for debugging has the program window, which displays the graphical object, and is adapted to present the menu to the user, and wherein the menu includes each of the one or more of the user interaction events identified as a selectable option.

3. The computer implemented method of claim 2, wherein: the program window comprising the menu is adapted to present the menu to the user by selectively modifying a portion of the computer program code, which is associated with the program window.

4. The computer implemented method of claim 1, wherein: the menu is presented to the user in response to a specified user request action.

5. The computer implemented method of claim 4, wherein: the menu comprises a context menu, which is displayed by the graphical object in response to the user inputting a specified key combination to the graphical object.

6. The computer implemented method of claim 4, wherein: the user implements the specified user request action by selectively interacting with a specified graphical user interface (GUI) widget, which is provided to initiate a procedure for setting one or more breakpoints in the computer program code.

7. The computer implemented method of claim 1, wherein: responsive to an occurrence of a given selected user interaction event, a line of code of the computer program code is identified, wherein the identified line of computer program code is used in confirming that the given selected user interaction event has occurred.

8. The computer implemented method of claim 7, wherein: setting a breakpoint in the computer program code includes setting a breakpoint in the line of code, which immediately follows the identified line of computer program code.

9. The computer implemented method of claim 1, wherein: the graphical object comprises one or more selected GUI widgets.

10. The computer implemented method of claim 9, wherein:
at least one of the GUI widgets is a type of widget selected from a group of widget types that include at least a button, a drop-down list, and a text box.

11. In association with a tool for debugging computer program code, the computer program code capable of presenting a graphical object, wherein the computer program code is responsive to each of one or more events of user interaction with the graphical object, a computer program product comprising instructions stored on a non-transitory recordable storage medium, the instructions comprising:

instructions for generating a menu that includes one or more of the user interaction events;

instructions for adapting a window associated with the graphical object to present the menu to a user, wherein the user is enabled to select one or more of the user interaction events included in the presented menu;

for a given user interaction event selected by the user, instructions for identifying a component of the computer program code that is associated with that selected user interaction event; and instructions for setting a breakpoint in the computer program code in selected relationship with each identified computer program code component, wherein a subsequent occurrence of one of selected user interaction events triggers a corresponding one of the breakpoint, and wherein:

the computer program code is computer program code of the graphical object and includes a computer program code component for the user interaction event associated with the graphical object;

the tool for debugging has a program window, which displays the graphical object, and is adapted to present the menu to the user, and wherein the computer program code is the computer program code of the graphical object and includes the computer program code component for the user interaction event associated with the graphical object;

the tool for debugging displays a debugging window and the program window;

the debugging window displays the computer program code of the graphical object including the computer program code component for the user interaction event associated with the graphical object;

the program window displays the graphical object, the menu, and a display button;

responsive to a right click on the display button, the menu is displayed including the user interaction event associated with the graphical object; and responsive to selection of the user interaction event from the menu, the breakpoint is set in the computer program code component for the user interaction event associated with the graphical object, and the breakpoint is displayed in the computer program code component displayed in the debugging window.

12. The computer program product of claim 11, wherein:
the tool for debugging has the program window, which displays the graphical object, and is adapted to present the menu to the user, and wherein the menu includes each of the one or more of the user interaction events identified as a selectable option.

13. The computer program product of claim 12, wherein:
the program window comprising the menu is adapted to present the menu to the user by selectively modifying a portion of the computer program code, which is associated with the program window.

14. The computer program product of claim 11, wherein:
the menu is presented to the user in response to a specified user request action.

15. The computer program product of claim 14, wherein:
the user implements the specified user request action by selectively interacting with a specified graphical user interface (GUI) widget, which is provided to initiate a procedure for setting one or more breakpoints in the computer program code.

16. The computer program product of claim 15, wherein:
the tool for debugging has the program window, which displays the graphical object, and is adapted to present the specified GUI widget to the user.

17. The computer program product of claim 11, wherein:
responsive to an occurrence of a given selected user interaction event, a line of code of the computer program code is identified, wherein the identified line of computer program code is used in confirming that the given selected user interaction event has occurred.

18. The computer program product of claim 17, wherein:
setting a breakpoint in the computer program code includes setting a breakpoint in the line of code, which immediately follows the identified line of computer program code.

19. The computer program product of claim 11, wherein:
the graphical object comprises one or more selected GUI widgets.

20. A computer system associated with a tool for debugging computer first program code, the first program code capable of presenting a graphical object, wherein the first program code is responsive to each of one or more events of user interaction with the graphical object, said system comprising:

a bus;

a memory connected to the bus, wherein second program code is stored on the memory; and a processor unit connected to the bus, wherein the processor unit executes the second program code:
to generate a menu that includes one or more of the user interaction events;
to adapt a window associated with the graphical object to present the menu to a user, wherein the user is enabled to select one or more of the user interaction events included in the presented menu;
for a given user interaction event selected by the user, to identify a component of the first program code that is associated with that selected user interaction event; and
to set a breakpoint in the first program code in selected relationship with each identified first program code component, wherein a subsequent occurrence of one of selected user interaction events triggers a corresponding breakpoint, and wherein:

the first program code is first program code of the graphical object and includes a first program code component for the user interaction event associated with the graphical object;

the tool for debugging has a program window, which displays the graphical object, and is adapted to present the menu to the user, and wherein the first program code is the first program code of the graphical object and includes the first program code component for the user interaction event associated with the graphical object;

the tool for debugging displays a debugging window and the program window;

the debugging window displays the first program code of the graphical object including the first program code component for the user interaction event associated with the graphical object;

the program window displays the graphical object, the menu, and a display button;

responsive to a right click on the display button, the menu is displayed including the user interaction event associated with the graphical object; and responsive to selection of the user interaction event from the menu, the breakpoint is set in the first program code component for the user interaction event associated with the graphical object, and the breakpoint is displayed in the first program code component displayed in the debugging window.

* * * * *